US007650121B2

(12) United States Patent
Lee et al.

(10) Patent No.: US 7,650,121 B2

(45) Date of Patent: Jan. 19, 2010

(54) TIME DIVISION DUPLEXING TRANSMISSION/RECEPTION APPARATUS AND METHOD USING POLARIZED DUPLEXER

(75) Inventors: Kie Jin Lee, Seoul (KR); Jong Cheol Kim, Seoul (KR); Doo Hee Song, Incheon (KR)

(73) Assignee: Industry - University Cooperation Foundation Sogang University, Seoul (KR)

( * ) Notice: Subject to any disclaimer, the term of this patent is extended or adjusted under 35 U.S.C. 154(b) by 473 days.

(21) Appl. No.: 11/356,686

(22) Filed: Feb. 17, 2006

(65) Prior Publication Data

US 2006/0187862 A1 Aug. 24, 2006

(30) Foreign Application Priority Data

Feb. 19, 2005 (KR) ..................... 10-2005-0013895

(51) Int. Cl.
*H04B 1/46* (2006.01)

(52) U.S. Cl. ............................ 455/81; 455/78; 455/82; 455/114.1; 455/323; 455/325; 455/328; 455/114.2; 455/296; 455/63.1; 333/132; 333/135; 333/1.1; 333/21 A

(58) Field of Classification Search ............. 455/78–83, 455/114.1–114.2, 296, 323, 325, 328, 63.1; 333/1.1, 21 A, 125–126, 129, 135, 137
See application file for complete search history.

(56) References Cited

U.S. PATENT DOCUMENTS 2,908,872 A * 10/1959 Kenton ....................... 333/1.1
4,758,806 A * 7/1988 Mohring et al. ............. 333/135
4,777,654 A * 10/1988 Conti .......................... 455/81
4,837,531 A * 6/1989 Gourlain et al. ............. 333/135
5,486,836 A 1/1996 Kuffner et al. .............. 343/700
5,784,033 A * 7/1998 Boldissar, Jr. ............... 343/786
6,583,683 B2 * 6/2003 Schubert et al. ........... 333/21 A
6,636,127 B2 * 10/2003 Van Meter .................. 333/125
7,078,985 B2 * 7/2006 Guguen et al. .............. 333/135

FOREIGN PATENT DOCUMENTS

| | | | |
|---|---|---|---|
| EP | 0 812 029 | A1 | 12/1997 |
| GB | 2 219 175 | A | 11/1989 |
| JP | 64-037128 | A | 2/1989 |
| JP | 1989-037128 | A | 2/1989 |
| JP | 1989-048501 | A | 2/1989 |
| JP | 1-501035 | A | 4/1989 |
| JP | 2002-158510 | A | 5/2002 |

* cited by examiner

*Primary Examiner*—Tuan A Tran
(74) *Attorney, Agent, or Firm*—Frommer Lawrence & Haug LLP; Ronald R. Santucci

(57) ABSTRACT

A time division duplexing (TDD) transmission/reception apparatus and method are provided. The TDD transmission/reception apparatus includes: a transmitter which generates a transmitted signal; an antenna which transmits the transmitted signal to an external device and receives a received signal from an external device; a receiver which restores source data by demodulating the received signal; and a polarized duplexer which has a first end connected to the transmitter and the receiver and a second end connected to the antenna and comprises an inclined surface, the inclined surface polarizing the transmitted signal and the received signal such that the directivity of the transmitted signal and the directivity of the received signal are perpendicular to each other.

8 Claims, 6 Drawing Sheets

TIME DIVISION DUPLEXING TRANSMISSION/RECEPTION APPARATUS AND METHOD USING POLARIZED DUPLEXER

CROSS-REFERENCE TO RELATED PATENT APPLICATION

This application claims the benefit of Korean Patent Application No. 10-2005-0013895, filed on Feb. 19, 2005, in the Korean Intellectual Property Office, the disclosure of which is incorporated herein in its entirety by reference.

BACKGROUND OF THE INVENTION

1. Field of the Invention

The present invention relates to a time division duplexing (TDD) transmission/reception apparatus and method, and more particularly, to a TDD transmission/reception apparatus and method which can enhance the efficiency of transmission/signal reception path isolation by polarizing transmitted signals and received signals with the aid of a polarized duplexer having an inclined surface such that the directivity of the transmitted signals is perpendicular to the directivity of the received signals.

2. Description of the Related Art

Time division duplexing (TDD) transmission/reception apparatuses use the same frequency band to transmit and receive signals. TDD transmission/reception apparatuses time-divide the transmission/reception of signals and downlink signals to an access point (i.e., a TDD base station) for a predetermined time period and then uplink signals from the access point for another predetermined time period.

In the case of using the same frequency band to transmit and receive signals as mentioned above, part of transmission power may be reflected by an antenna port and thus be infiltrated into a signal reception path of a reception system regardless of how perfectly the impedance of an antenna matches the impedance of a transmission/reception apparatus, thus resulting in a high signal reception path gain. A high signal reception path gain may considerably damage the reception system and adversely affect the reception sensitivity of the reception system, thereby lowering the reception capabilities of the transmission/reception apparatus. In addition, noise signals generated by a transmitter during the reception of received signals may interfere with the received signals, thereby lowering the reception capabilities of the transmission/reception apparatus.

Therefore, TDD transmission/reception apparatuses need an apparatus and method for minimizing the possibility of transmitted signals interfering with received signals by isolating a signal reception path from a signal transmission path.

FIG. 1 is a block diagram of a conventional TDD transmission/reception apparatus having radio frequency (RF) switches 150 and 155 for isolating a signal transmission path from a signal reception path. Referring to FIG. 1, the TDD transmission/reception apparatus includes a transmitter 100, a receiver 105, a high power amplifier (HPA) 110, a circulator 115, a band pass filter (BPF) 120, an antenna 125, and a synchronization signal generator 185. The transmitter 100 includes a modulator 130, an up converter 135, an RF amplifier 140, a step attenuator 145, and the RF switch 150. The receiver 105 includes a demodulator 180, a down converter 170, a step attenuator 165, a low noise amplifier 160, and the RF switch 155.

FIGS. 2A and 2B illustrate examples of the format of a frame of the conventional TDD transmission/reception apparatus illustrated in FIG. 1. Referring to FIGS. 2A and 2B, an uplink and a downlink are conducted at different times. In detail, referring to FIG. 2A, an uplink and a downlink are conducted with an uplink-downlink ratio of 16:6. Referring to FIG. 2B, an uplink and a downlink are conducted with an uplink-downlink ratio of 13:9. The synchronization signal generator 185 generates synchronization signals which turn on or off the RF switches 150 and 155 in response to the synchronization with an uplink with a downlink at a uniform interval TTG. The RF switch 150 in the transmitter 100 is turned on in response to a synchronization signal generated by the synchronization signal generator 185 and is turned off during a downlink period. On the other hand, the RF switch 155 in the receiver 105 is turned off during an uplink period and is turned on during the downlink period. A signal transmission path and a signal reception path can be isolated from each other by controlling the turning on or off of the RF switches 150 and 155.

The operation of the conventional TDD transmission/reception apparatus using the RF switches 150 and 155 will now be described in detail. The modulator 130 generates a transmitted signal to be transmitted, and the up converter 135 up-converts the frequency of the transmitted signal such that the transmitted signal can be readily transmitted. The RF amplifier 140 amplifies the transmitted signal, and the step attenuator 145 attenuates the power of the transmitted signal in steps. Thereafter, the transmitted signal is input to the HPA 110 only for an uplink period, and the HPA 110 amplifies the transmitted signal so that the transmitted signal has a very high power, and outputs the amplified result.

The RF switch 155 in the receiver 105 receives a received signal received via the antenna 125 from the circulator 115 only for a downlink period, and outputs the received signal to the LNA 160. The LNA 160 amplifies the received signal while minimizing noise. The step attenuator 165 attenuates the power of the received signal in steps, and the down converter 170 down-converts the frequency of the received signal. The demodulator 180 demodulates the received signal output by the down converter 170, thereby restoring desired source data.

The antenna 125 amplifies a transmitted signal. Then, the antenna 125 emits the amplified result to the air and receives a received signal from the air. The BFP 120 filters a transmitted signal and a received signal to a frequency band used by the conventional TDD transmission/reception apparatus, and the circulator 115 transmits a transmitted signal output by the HPA 110 to the BPF 120 and transmits a received signal received via the antenna 125 to the receiver 105.

As described above, in a case where a conventional TDD transmission/reception apparatus isolates a signal transmission path from a signal reception path using RF switches, a frame synchronization signal of a transmitted signal and a received signal must be extracted to control the RF switches, and then the RF switches must be turned on or off in response to the extracted frame synchronization signal while keeping monitoring the extracted frame synchronization signal. Thus, the structure of the conventional TDD transmission/reception apparatus may become too much sophisticated. In addition, since there is a need to realize a synchronization signal extraction algorithm, the manufacturing cost of the conventional TDD transmission/reception apparatus may increase.

Conventionally, as indicated in Table 1 below, the switching time of RF switches must be controlled within several dozens of usec, and thus, a high precision switching control technique is required. In addition, the control of the RF switches must be performed at intervals of 5 msec, and thus, a high precision switching control technique which can ensure a high durability against a considerable number of switching control repetitions is required. Repetitive RF switch controls, however, deteriorate the performance of RF switches over time, and eventually reduce the lifetime of transmission/reception apparatuses considerably.

TABLE 1

| Variables | Values |
|---|---|
| Channel Bandwidth | 10 MHz |
| Sampling Frequency ($F_s$) | 10 MHz |
| Sampling Interval ($1/F_s$) | 100 nsec |
| FFT Size ($N_{FFT}$) | 1024 |
| Quantity of Sub-Carriers Used | 864 |
| Quantity of Data Sub-Carriers | 768 |
| Quantity of Pilot Sub-Carriers | 96 |
| Sub-Carrier Frequency Interval | 9.765625 KHz |
| Valid Symbol Time ($T_b = 1/\Delta f$) | 102.4 μs |
| CP Time ($T_g = T_b/8$) | 12.8 μs |
| OFDMA Symbol Time ($T_s = T_b + T_g$) | 115.2 μs |
| TDD Frame Length | 5 ms |

SUMMARY OF THE INVENTION

The present invention provides a TDD transmission/reception apparatus and method which can enhance the efficiency of transmission/signal reception path isolation without using RF switches by polarizing transmitted signals and received signals with the aid of a polarized duplexer having an inclined surface such that the directivity of the transmitted signals is perpendicular to the directivity of the received signals.

According to an aspect of the present invention, there is provided a time division duplexing (TDD) transmission/reception apparatus. The TDD transmission/reception apparatus includes: a transmitter which generates a transmitted signal; an antenna which transmits the transmitted signal to an external device and receives a received signal from an external device; a receiver which restores source data by demodulating the received signal; and a polarized duplexer which has a first end connected to the transmitter and the receiver and a second end connected to the antenna and comprises an inclined surface, the inclined surface polarizing the transmitted signal and the received signal such that the directivity of the transmitted signal and the directivity of the received signal are perpendicular to each other.

The transmitter and the receiver may be connected to the first end of the polarized duplexer such that they can be perpendicular to each other.

The polarized duplexer may include 2 inclined surfaces which polarize the transmitted signal and the received signal such that the directivity of the transmitted signal and the directivity of the received signal are perpendicular to each other, wherein the 2 inclined surfaces are symmetrical.

The transmitter may include a polarization filter which filters the transmitted signal, and the receiver may include a polarization filter which filters the received signal.

The polarized duplexer may be a polarized waveguide.

The polarized duplexer may include: a first polarized rectangular waveguide which is connected to the transmitter; a second polarized rectangular waveguide which is connected to the receiver; and a circular waveguide which is connected to the antenna.

The inclination angle of the inclined surface may be determined according to a frequency band used by the TDD transmission/reception apparatus.

According to another aspect of the present invention, there is provided a TDD transmission/reception method. The TDD transmission/reception method includes: generating a transmitted signal; receiving a received signal from an external device via an antenna; polarizing the transmitted signal and the received signal such that the directivity of the transmitted signal and the directivity of the received signal are perpendicular to each other; restoring source data by demodulating the received signal; and transmitting the polarized transmitted signal to an external device via the antenna.

The polarizing may include making the transmitted signal and the received signal incident upon an inclined surface in perpendicular directions such that they can be perpendicular to each other.

The polarizing may include making the transmitted signal and the received signal incident upon 2 inclined surfaces in perpendicular directions such that the directivity of the transmitted signal and the directivity of the received signal are perpendicular to each other, wherein the 2 inclined surfaces are symmetrical.

The inclination angle of the inclined surface may be determined according to a frequency band used for transmitting/receiving signals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
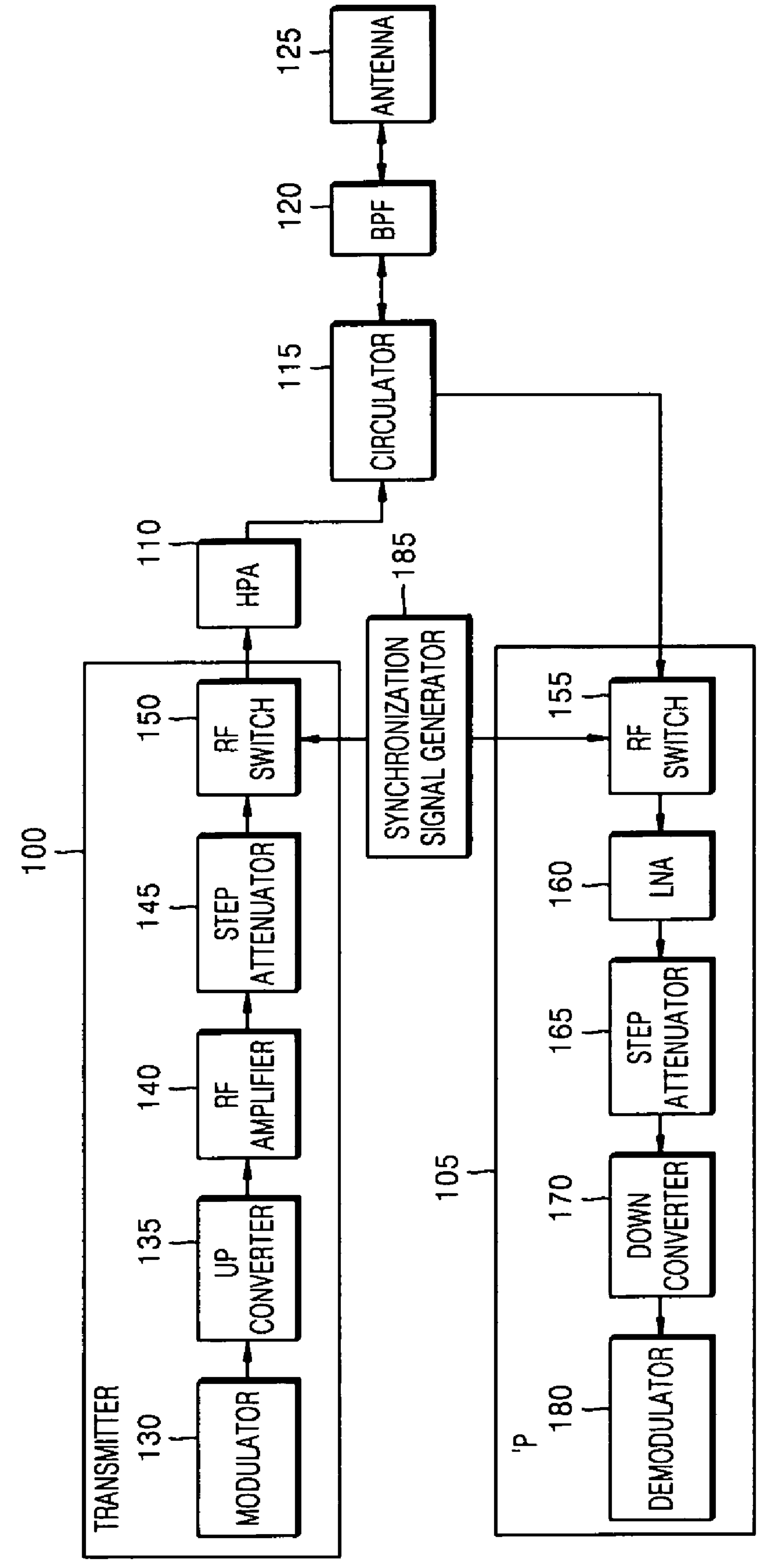
FIG. 1 is a block diagram of a conventional time division duplexing (TDD) transmission/reception apparatus using RF switches.
Figure 2A:
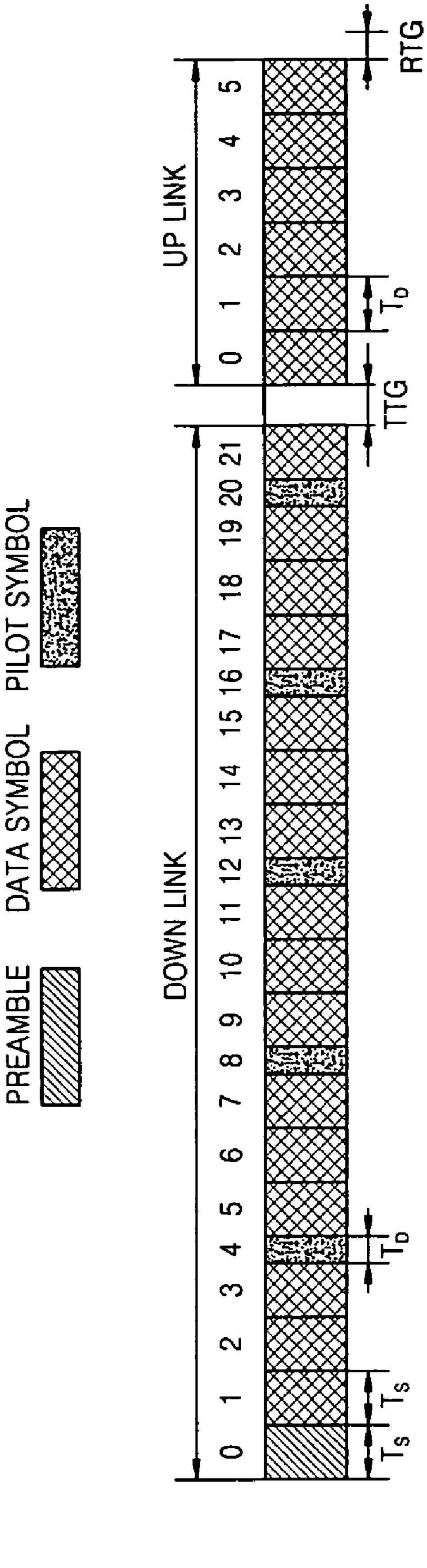
FIGS. 2A and 2B are diagrams illustrating examples of the format of a frame of a conventional TDD transmission/reception apparatus.
Figure 2B:
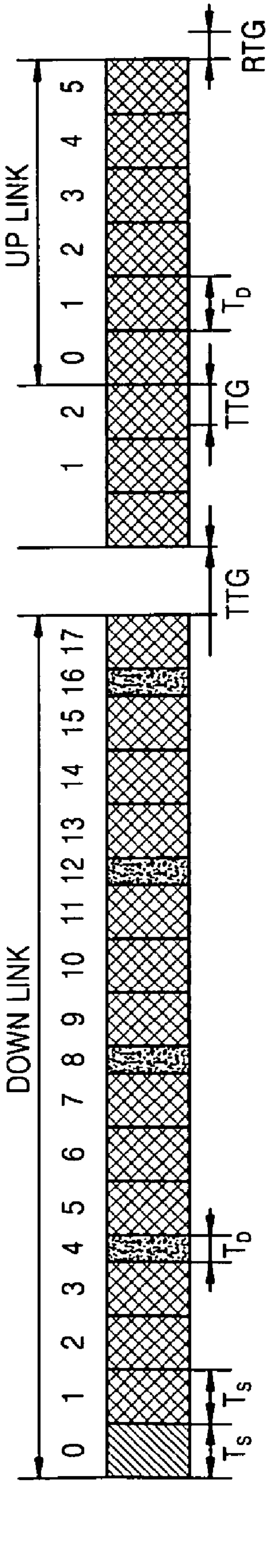
Figure 3:
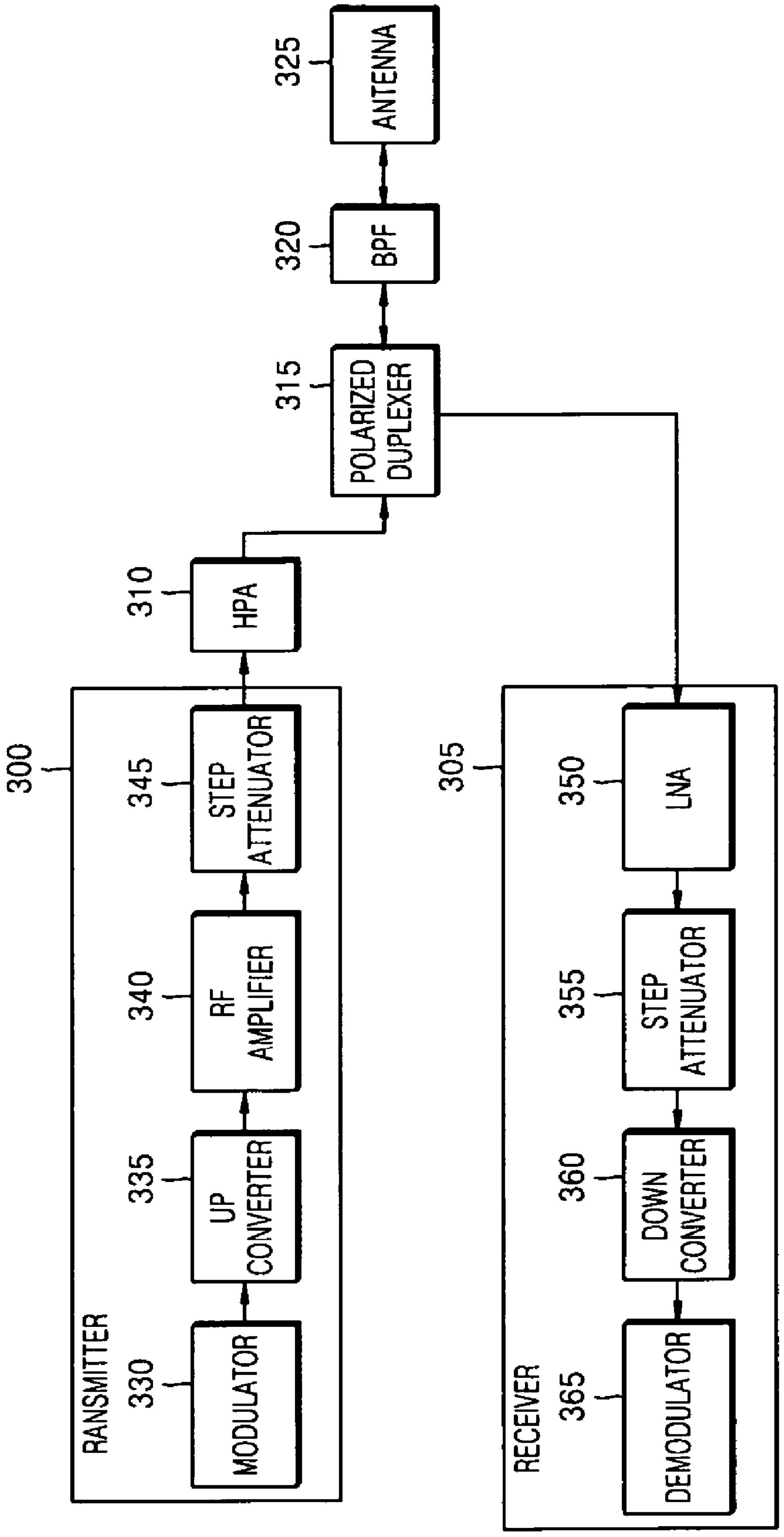
FIG. 3 is a block diagram of a TDD transmission/reception apparatus using a polarized duplexer according to an exemplary embodiment of the present invention.

FIG. 3 is a block diagram of a TDD transmission/reception apparatus using a polarized duplexer 315 according to an exemplary embodiment of the present invention. Referring to FIG. 3, the TDD transmission/reception apparatus includes a transmitter 300, a receiver 305, an HPA 310, the polarized duplexer 315, a BPF 320, and an antenna 325. The transmitter 300 includes a modulator 330, an up converter 335, an RF amplifier 340, and a step attenuator 345. The receiver 305 includes a demodulator 365, a down converter 360, a step attenuator 355, and an LNA 350.

The modulator 330 generates a transmitted signal to be transmitted. The up converter 335 up-converts the frequency of the transmitted signal such that the transmitted signal can be readily transmitted. The RF amplifier 340 amplifies the transmitted signal. The step attenuator 345 attenuates the power of the transmitted signal in steps. The HPA 110 amplifies the transmitted signal to have a very high power and outputs the amplified result.

The antenna 325 receives signals transmitted by an external device (not shown) from the air. Of the received signals, the BPF 320 filters the received signals corresponding to a frequency band used by the TDD transmission/reception apparatus.

The polarized duplexer 315 polarizes a transmitted signal output by the HPA 310 and a received signal BPF 320 using an inclined surface such that the directivity of the transmitted signal is perpendicular to the directivity of the received signal. The transmitted signal which has been polarized so as to be perpendicular to the received signal and to have a high power by the inclined surface of the polarized duplexer 315 does not interfere with the received signal. Thus, the transmitted signal passes through the polarized duplexer 315, and the received signal which is input to the receiver 305 is neither flawed by nor mixed with the transmitted signal or a noise signal.

The LNA 350 of the receiver 305 amplifies the received signal while minimizing noise. The step attenuator 355 attenuates the power of the received signal in steps. The down converter 360 down-converts the frequency of the received signal. The demodulator 365 demodulates the received signal down-converted by the down converter 360, thereby restoring desired source data.

Figure 4:
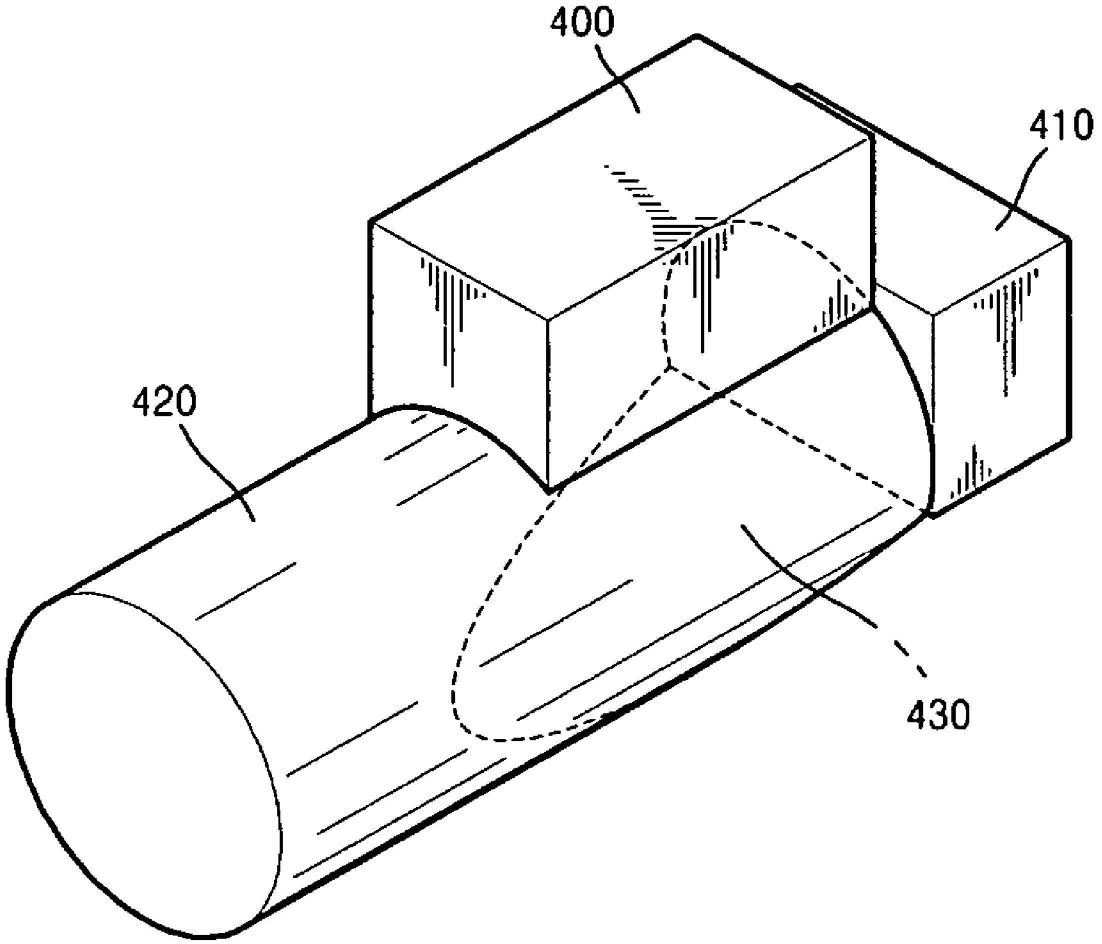
FIG. 4 is a perspective view of a polarized duplexer according to an exemplary embodiment of the present invention.

FIG. 4 is a perspective view of a polarized duplexer according to an exemplary embodiment of the present invention. Referring to FIG. 4, the polarized duplexer includes a first waveguide 400, a second waveguide 410, and a third waveguide 420. The third waveguide 420 is cylindrical. A first end of the third waveguide 420 is connected to an antenna (not shown), and a second end of the third waveguide 420 is connected to the first and second waveguides 400 and 410. The third waveguide 420 includes an inclined surface 430. The first and second waveguides 400 and 410 may be located so that they can make the directivity of a transmitted signal and the directivity of a received signal perpendicular to each other.

The first waveguide 400 is connected to the transmitter 300 of FIG. 3. Thus, a transmitted signal generated by the transmitter 300 can be incident upon the inclined surface 430 of the third waveguide 420. Then, the transmitted signal is polarized toward a first direction which is determined according to the inclination angle of the inclined surface 430 and the angle at which the transmitted signal is incident upon the inclined surface 430. Thereafter, the polarized transmitted signal passes through the third waveguide 420 and is output to the antenna to which the third waveguide 420 is connected.

Signals having arbitrary directivities are received via an antenna, pass through the polarized duplexer 315, and are transmitted to the receiver 305 of FIG. 3. The received signals having arbitrary directivities are mixed with transmitted signals having very high powers in the third waveguide 420. However, of the received signals, only the received signal which is directed toward a second direction which is perpendicular to the first direction can pass through the third waveguide 420 without being interfered by the polarized transmitted signal.

Thereafter, the received signal which is directed toward the second direction and is thus prevented from being interfered by the polarized transmitted signal is incident upon the inclined surface 430 and is output to the receiver 305 via the second waveguide 410. Thereafter, the receiver 305 can restore source data which is not affected by the polarized transmitted signal, by modulating the received signal which is directed toward the second direction.

Figure 5:
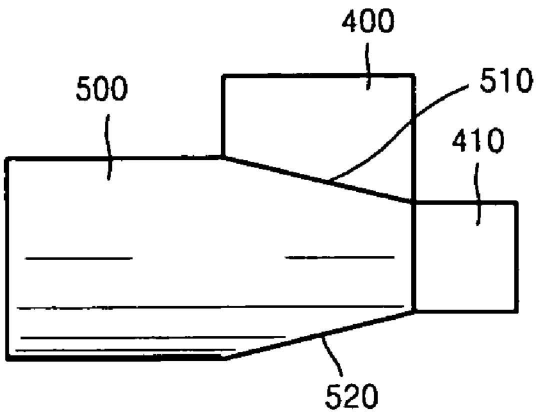
FIG. 5 is a cross-sectional view of a polarized duplexer according to another exemplary embodiment of the present invention.

FIG. 5 is a cross-sectional view of a polarized duplexer according to another exemplary embodiment of the present invention. Referring to FIG. 5, a third waveguide 500 may include 2 inclined surfaces 510 and 520 which are symmetrical. The inclined surfaces 510 and 520 may be formed to connect a connection area between the third waveguide 500 and a second waveguide 410 and a connection area between the third waveguide 500 and a first waveguide 400. The sizes of the first through third waveguides 400, 410, and 500 may be altered according to a frequency band used for transmitting/receiving signals and the specifications of a transmission/reception apparatus used for transmitting/receiving signals. Therefore, the inclination angles and length of the inclined surfaces 510 and 520 may be also altered according to a frequency band used for transmitting/receiving signals and the specifications of a transmission/reception apparatus used for transmitting/receiving signals.

Figure 6:
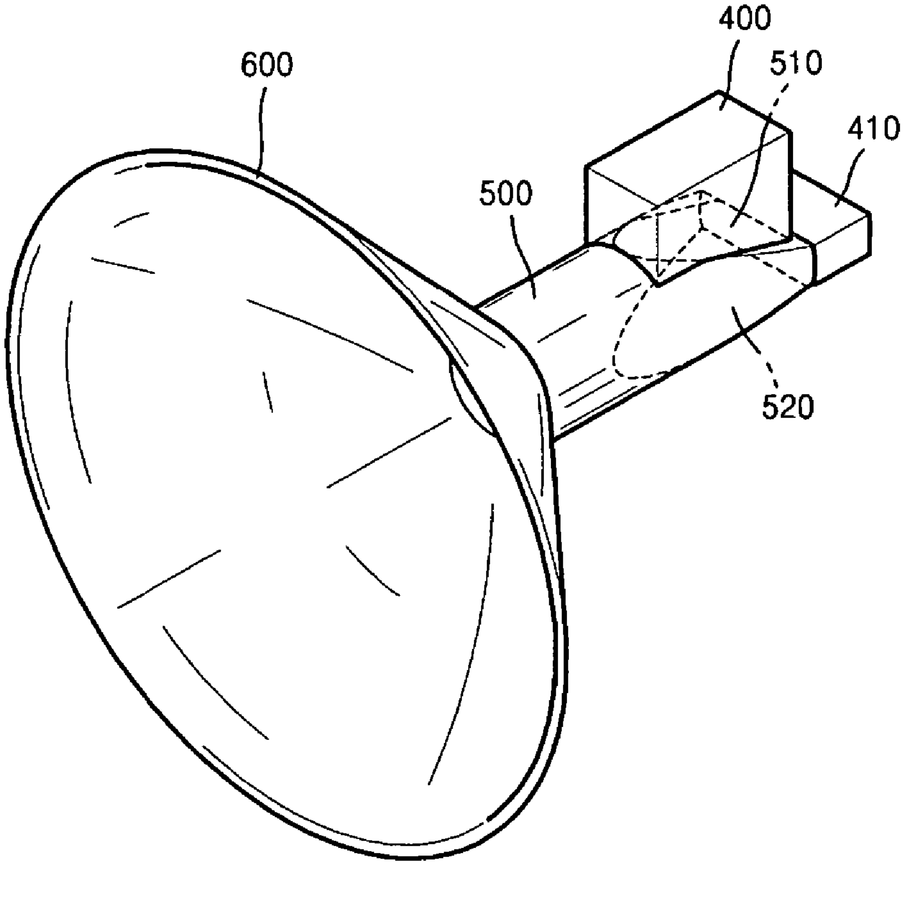
FIG. 6 is a perspective view of a polarized duplexer to which an antenna is connected, according to an exemplary embodiment of the present invention.

FIG. 6 is a perspective view of a polarized duplexer which has 2 inclined surfaces and is connected to an antenna according to an exemplary embodiment of the present invention.

Figure 7:
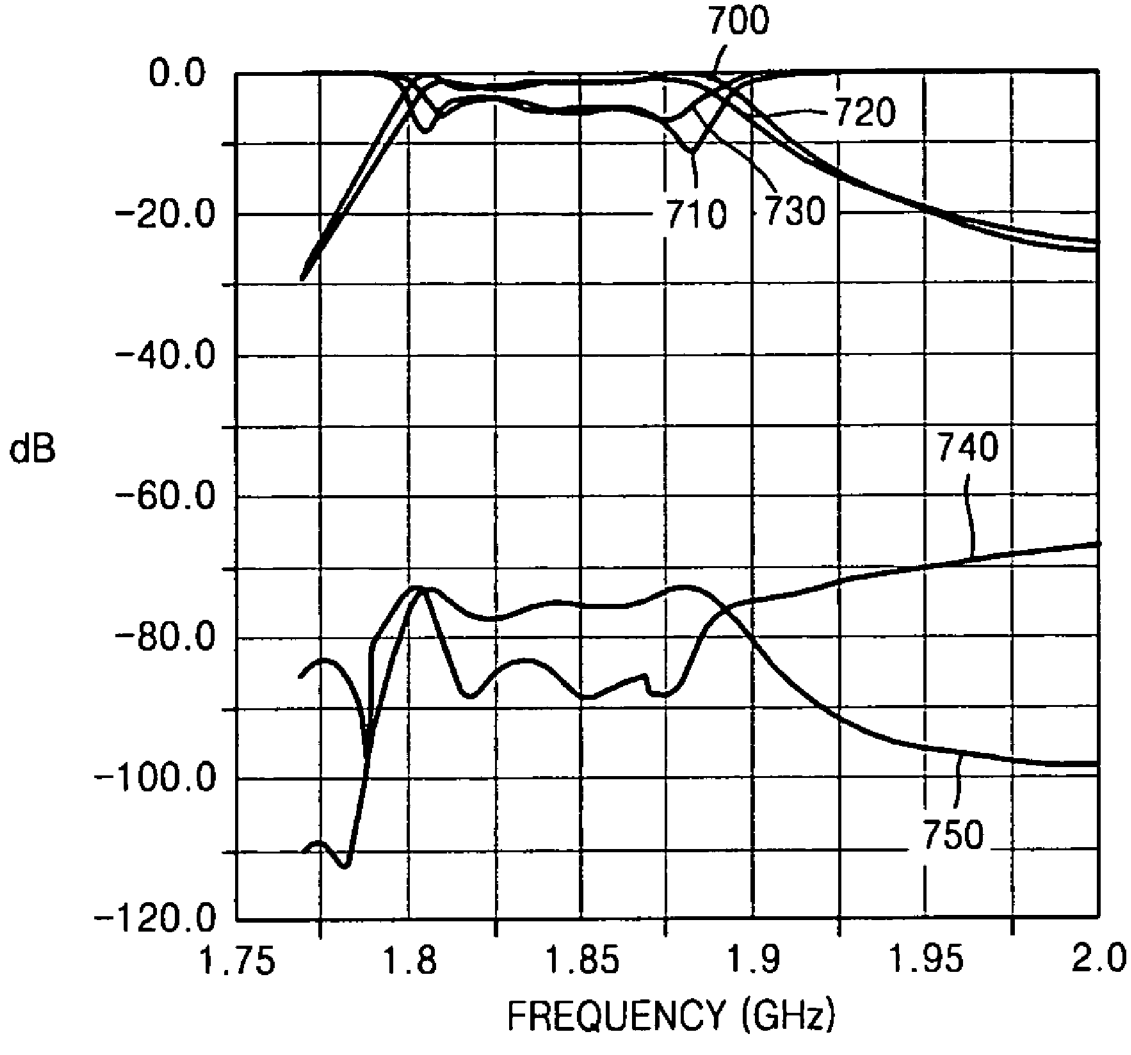
FIG. 7 is a graph illustrating experimental results obtained by measuring S parameters of a TDD transmission/reception apparatus using a polarized duplexer according to an exemplary embodiment of the present invention.

FIG. 7 is a graph illustrating experimental results obtained by measuring S parameters of the TDD transmission/reception apparatus of FIG. 3 when using a terminal of the antenna 326, a terminal of the transmitter 300, and a terminal of the receiver 305 as port 1, port 2, and port 3, respectively.

Referring to FIG. 7, a curve 700 illustrates the variation of an $S_{13}$ parameter, a curve 710 illustrates the variation of an $S_{33}$ parameter, a curve 720 illustrates the variation of an $S_{12}$ parameter, and a curve 730 illustrates the variation of an $S_{22}$ parameter. As indicated by the curves 700 through 730, transmitted signals and received signals belonging to a desired frequency band transmit through the TDD transmission/reception apparatus using a polarized duplexer according to an exemplary embodiment of the present invention with the same resonance frequencies.

A curve 740 illustrates the variation of an $S_{23}$ parameter measured at the receiver 305 of the TDD transmission/reception apparatus, a curve 750 illustrates the variation of the $S_{23}$ parameter measured at the transmitter 300 of the TDD transmission/reception apparatus. Values of the $S_{23}$ parameter represented by the curves 740 and 750 are a factor for determining the efficiency of isolating a signal transmission path of the transmitter 300 from a signal reception path of the receiver 305. Therefore, as indicated by the curves 740 and 750, the TDD transmission/reception apparatus using a polarized duplexer according to an exemplary embodiment of the present invention can achieve a high transmission/signal reception path isolation of −60 dB or greater.

As described above, according to the present invention, transmitted signals and received signals are polarized with the aid of a polarized duplexer having one or more inclined surfaces such that the directivity of the transmitted signals is perpendicular to the directivity of the received signals. Therefore, it is possible to protect a receiver from transmitted signals without using RF switches, which complicate the structure of a TDD transmission/reception apparatus and increase the manufacturing cost of the TDD transmission/reception apparatus, by enhancing the efficiency of transmission/signal reception path isolation. In addition, it is possible to minimize the noise level of transmitted signals input to the receiver.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A time division duplexing (TDD) transmission/reception apparatus comprising:

a transmitter which generates a transmitted signal;

an antenna which transmits the transmitted signal to an external device and receives a received signal from an external device;

a receiver which restores source data by demodulating the received signal; and a polarized duplexer which has a first end connected to the transmitter and the receiver and a second end connected to the antenna and comprises an inclined surface, the inclined surface polarizing the transmitted signal and the received signal such that the directivity of the transmitted signal and the directivity of the received signal are perpendicular to each other, wherein the inclination angle of the inclined surface is determined according to a frequency band used by the TDD transmission/reception apparatus.

2. The TDD transmission/reception apparatus of claim 1, wherein the transmitter and the receiver are connected to the first end of the polarized duplexer such that they can be perpendicular to each other.

3. The TDD transmission/reception apparatus of claim 1, wherein the polarized duplexer comprises 2 inclined surfaces which polarize the transmitted signal and the received signal such that the directivity of the transmitted signal and the directivity of the received signal are perpendicular to each other, wherein the 2 inclined surfaces are symmetrical.

4. The TDD transmission/reception apparatus of claim 1, wherein the transmitter comprises a polarization filter which filters the transmitted signal, and the receiver comprises a polarization filter which filters the received signal.

5. The TDD transmission/reception apparatus of claim 1, wherein the polarized duplexer is a polarized waveguide.

6. The TDD transmission/reception apparatus of claim 1, wherein the polarized duplexer comprises: a first polarized rectangular waveguide which is connected to the transmitter; a second polarized rectangular waveguide which is connected to the receiver; and a circular waveguide which is connected to the antenna.

7. A TDD transmission/reception method comprising:

generating a transmitted signal;

receiving a received signal from an external device via an antenna;

polarizing the transmitted signal and the received signal such that the directivity of the transmitted signal and the directivity of the received signal are perpendicular to each other;

restoring source data by demodulating the received signal; and transmitting the polarized transmitted signal to an external device via the antenna, wherein the polarizing comprises making the transmitted signal and the received signal incident upon an inclined surface in perpendicular directions such that they can be perpendicular to each other, and wherein the inclination angle of the inclined surface is determined according to a frequency band used for transmitting/receiving signals.

8. The TDD transmission/reception method of claim 7, wherein the polarizing comprises making the transmitted signal and the received signal incident upon 2 inclined surfaces in perpendicular directions such that the directivity of the transmitted signal and the directivity of the received signal are perpendicular to each other, wherein the 2 inclined surfaces are symmetrical.

* * * * *

UNITED STATES PATENT AND TRADEMARK OFFICE

CERTIFICATE OF CORRECTION

PATENT NO. : 7,650,121 B2
APPLICATION NO. : 11/356686
DATED : January 19, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 809 days.

Signed and Sealed this

Twenty-eighth Day of December, 2010

David J. Kappos

David J. Kappos
*Director of the United States Patent and Trademark Office*